United States Patent
Sherlekar et al.

(10) Patent No.: US 11,790,150 B2
(45) Date of Patent: *Oct. 17, 2023

(54) PLACEMENT AND SIMULATION OF CELL IN PROXIMITY TO CELL WITH DIFFUSION BREAK

(71) Applicant: Synopsys, Inc., Mountain View, CA (US)

(72) Inventors: Deepak Dattatraya Sherlekar, Cupertino, CA (US); Shanie George, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,498

(22) Filed: Jun. 14, 2022

(65) Prior Publication Data

US 2022/0309223 A1    Sep. 29, 2022

Related U.S. Application Data

(63) Continuation of application No. 17/093,457, filed on Nov. 9, 2020, now Pat. No. 11,403,454.

(51) Int. Cl.
*G06F 30/398* (2020.01)
*G06F 30/392* (2020.01)
*G06F 30/367* (2020.01)

(52) U.S. Cl.
CPC .......... *G06F 30/398* (2020.01); *G06F 30/367* (2020.01); *G06F 30/392* (2020.01)

(58) Field of Classification Search
CPC ............. G06F 2111/10; G06F 30/3312; G06F 30/367; G06F 30/392; G06F 30/398;
(Continued)

(56) References Cited

U.S. PATENT DOCUMENTS

| | | | |
|---|---|---|---|
| 7,897,479 B2* | 3/2011 | Lin | H01L 21/823878 438/444 |
| 7,943,967 B2* | 5/2011 | Becker | H01L 27/0207 257/E27.099 |

(Continued)

OTHER PUBLICATIONS

Heo, S. I. et al. "Diffusion Break-Aware Leakage Power Optimization and Detailed Placement in Sub-10nm VLSI." Proceedings of the 24th Asia and South Pacific Design Automation Conference, Jan. 21, 2019, pp. 550-556.

(Continued)

*Primary Examiner* — Binh C Tat
(74) *Attorney, Agent, or Firm* — Fenwick & West LLP

(57) ABSTRACT

A system and method for placement and simulation of a cell in proximity to a cell with a diffusion break is herein disclosed. According to one embodiment, an integrated circuit is designed to include a first cell that has a first edge and a second edge opposite the first edge. The first cell may also include a diffusion region that extends from the first edge to the second edge with a diffusion break separating the diffusion region. The diffusion break may be spaced away from the second edge by a distance that degrades a metric (e.g., a delay, a slew, dynamic power, or leakage) of a second cell placed next to the second edge beyond a threshold level.

20 Claims, 9 Drawing Sheets

(58) Field of Classification Search
CPC .............. G06F 30/394; G06F 2111/04; G06F 2119/18; G06F 3/013; G06F 11/0793; G06F 11/1008; G06F 11/1048; G06F 11/183; G06F 11/186; G06F 11/106; G06F 11/1068; G06F 11/1076; G06F 11/1096; G06F 11/14; G06F 3/04815; G06F 3/04847; G06F 30/327; G06F 30/39; G06F 21/32; G06F 21/34; G06F 21/73; G06F 2221/2153; G06F 3/03545; G06F 3/03547; G06F 3/04162; G06F 3/042; G06F 3/044; H01L 27/0207; H01L 29/1083; H01L 27/0921; H01L 21/823493; H01L 21/823807; H01L 21/823892; H01L 29/7834; H01L 29/66628; H01L 29/66568; H01L 21/823481; H01L 21/823412; H01L 21/26513; H01L 2924/13091; H01L 29/7838; H01L 29/775; H01L 2224/80896; H01L 2221/68359; H01L 2225/06517; H01L 2225/0651; H01L 2027/11875; H01L 27/1225; H10B 10/12; H10B 10/125; H10B 12/20; H10B 12/09; H10B 63/845; H10B 43/20; H10B 41/20; G03F 1/36

USPC .................................................. 716/110–117
See application file for complete search history.

(56) References Cited

U.S. PATENT DOCUMENTS

| | | | |
|---|---|---|---|
| 8,214,778 B2* | 7/2012 | Quandt | H01L 27/11803 716/110 |
| 8,504,969 B2* | 8/2013 | Lin | G06F 30/00 716/120 |
| 11,403,454 B2* | 8/2022 | Sherlekar | G06F 30/367 |

OTHER PUBLICATIONS

Neogi, T. G. et al. "Design Space Analysis of Novel Interconnect Constructs for 22NM FDX™ Technology." Proceedings of SPIE, vol. 10148, Mar. 30, 2017, pp. 1-7.
Park, D. et al. "SP&R: Simultaneous Placement and Routing Framework for Standard Cell Synthesis in Sub-7nm." Proceedings of the 25th Asia and South Pacific Design Automation Conference, Jan. 13, 2020, pp. 345-350.
PCT International Search Report and Written Opinion, PCT Application No. PCT/US2021/058113, dated Feb. 24, 2022, 17 pages.
United States Office Action, U.S. Appl. No. 17/093,457, filed Oct. 4, 2021, nine pages.

* cited by examiner

PLACEMENT AND SIMULATION OF CELL IN PROXIMITY TO CELL WITH DIFFUSION BREAK

CROSS REFERENCE TO RELATED APPLICATIONS

This application is a continuation of prior, co-pending, U.S. application Ser. No. 17/093,457, filed on Nov. 9, 2020, which is incorporated herein by reference in its entirety for all purposes.

TECHNICAL FIELD

The present disclosure generally relates to an integrated circuit design system. In particular, the present disclosure relates to a system and method for providing placement and simulation of a cell in proximity to another cell with a diffusion break in a continuous diffusion semiconductor processes.

BACKGROUND

A semiconductor process using continuous diffusion does not have diffusion breaks to isolate electrically different diffusions from each other. A desired electrical isolation may be accomplished using dummy transistors with gates tied to supply or ground. Cell-based designs may employ a small number of cells which have a break in their continuous diffusion. The most common cell having a diffusion break is a well tap cell which contains n-well and substrate contacts needed to prevent latch-up. Diffusion breaks adversely affect metrics of cells placed near them.

Conventional cell based chip design flows do not use space on a chip in the vicinity of a diffusion break in order to avoid accounting for its impact on timing and power of cells placed close to it. The diffusion break impact is highest on cells placed close to the break and the impact may taper off as cells are placed farther away from the break. If a designer wants to use the space in the vicinity of a break, conventional methods used by electronic design automation (EDA) flows may model the impact with derate tables of dimension D×D for cells placed within D placement grids from the left and/or right of diffusion breaks. An EDA system selects a value for the parameter D such that a metric of the cells does not change substantially when the cells are placed greater than D placement grids from the diffusion break. The value of D is based on one or more characteristics of the semiconductor process. A derate table may capture the effect of a diffusion break on metrics (e.g., a delay, a slew, dynamic power, and leakage) of cells placed near the diffusion break. The dimensions of the table may represent distances of left and right boundaries of a cell from the diffusion break. Derate values may vary with different input slew and output load combinations for which cells are characterized. Hence, this approach may involve characterizing D×D derate tables for every load and slew combination in tables of cell models, effectively creating $D^2$ timing models of every cell. This makes cell characterization and timing analysis expensive in terms of memory usage and computation time. To avoid this, cell libraries used in conventional EDA tool flows for continuous diffusion processes effectively prevent cells from being placed within D placement grids from a diffusion break by artificially increasing the size of a cell with a diffusion break so that the diffusion break is greater than D placement grids from the cell boundary. However, this reduces the amount of space available for placing other cells within the integrated circuit design.

SUMMARY

Embodiments relate to systems and methods for designing an integrated circuit. In one embodiment, a method includes placing a first cell on one side of a second cell, where the first cell includes a first edge, a second edge at an opposite side to the first edge of the first cell, and a diffusion region extending from the first edge to the second edge with the diffusion break separating the diffusion region. The second cell may include a third edge spaced away from the diffusion break with a specified distance. A simulation model is selected from one or more simulation models, where each simulation model is associated with a respective edge of a given cell spaced away from a given diffusion break with a corresponding specified distance less than or equal to a threshold distance. A simulation of the second cell may then be performed using the selected simulation model.

In some embodiments, the simulation models include three models: a first model including a first plurality of metrics associated with placing the third edge facing the first edge and spaced away from the diffusion break with the specified distance, a second model including a second plurality of metrics associated with placing the third edge facing the second edge and spaced away from the diffusion break with the specified distance, and a third model including a third plurality of metrics associated with placing the third edge spaced away from the diffusion break greater than the threshold distance. The first model may be selected responsive to placing the third edge facing the first edge and spaced away from the diffusion break with the specified distance. The second model may be selected responsive to placing the third edge facing the second edge and spaced away from the diffusion break with the specified distance. The third model may be selected responsive to placing the third edge spaced away from the diffusion break greater than the threshold distance.

A distance from the diffusion break to the first edge may be less than the specified distance and wherein the third edge facing the first edge is spaced away from the first edge by a separation distance that corresponds to a difference between the distance and the specified distance. The first cell may be a well tap cell. The second cell may be a delay cell.

The specified distance may be one of a plurality of specified distances, and at least a first respective simulation model and a second respective simulation model are associated with each specified distance of the plurality of specified distances. The first respective model may include a first plurality of metrics associated with placing the third edge facing the first edge and spaced away from the diffusion break with the respective specified distance. The second respective model may include a second plurality of metrics associated with placing the third edge facing the second edge and spaced away from the diffusion break with the respective specified distance.

Embodiments also relate to a first cell for designing an integrated circuit that includes a first edge, a second edge at an opposite side to the first edge of the first cell, and a diffusion region extending from the first edge to the second edge with a diffusion break separating the diffusion region. The diffusion break may be spaced away from the second edge by a distance that changes beyond a threshold level a metric of a second cell placed next to the second edge.

In one embodiment, the first cell is a well tap cell. The second cell may abut the first cell or be separated from the diffusion break (e.g., by a user-specified distance that causes the metric of the second cell to change beyond the threshold level). The second cell may be separated from the second edge by a separation distance corresponding to a difference between the distance and the user-specified distance. Additionally, the diffusion break may be spaced away from the first edge by a predetermined threshold distance that causes the metric of a given cell placed next to the first edge to be substantially unaffected by the diffusion break (i.e., the metric of the second cell does not change beyond the threshold level). The second edge may be the left or the right of the diffusion break.

BRIEF DESCRIPTION OF DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to designing an integrated circuit that includes at least one cell with a diffusion break spaced away from an edge of the cell by a distance that causes a metric (e.g., a delay, a slew, dynamic power, and leakage) of another cell placed next to the second edge to change beyond a threshold level. Other cells may be placed next to a cell having a diffusion break at a specified distance or gate pitches away from the diffusion break, impacted by the diffusion break beyond the threshold level, or a distance that avoids impact from the diffusion break. This placement technique reduces the number of models necessary to capture the effects of a diffusion break on cells placed near the diffusion break and enables efficient use of space in the integrated circuit.

The diffusion break described herein refers to a break in a diffusion region that extends from a first edge of a cell to a second edge that is opposite to the first edge of the cell. A diffusion break may change (e.g., degrade or improve) a metric of cells located near the diffusion break. This change may reduce the accuracy of estimating a cell design's metric. While embodiments described herein may refer to the degradation of a cell's metric caused by the placement of the cell near a diffusion break, the metric of the cell may also increase as an effect of the diffusion break. For example, a diffusion break may increase or decrease the delay of a cell, causing undesired speed-up or slow-down of signals that reduce the accuracy of estimating the cell design's delay.

A cell described herein refers to a logical cell for performing a logical function. One or more cell may be combined to form a physical cell. For example, a single physical cell of a multi-bit cell may include a plurality of logical single-bit cells.

Figure 1:
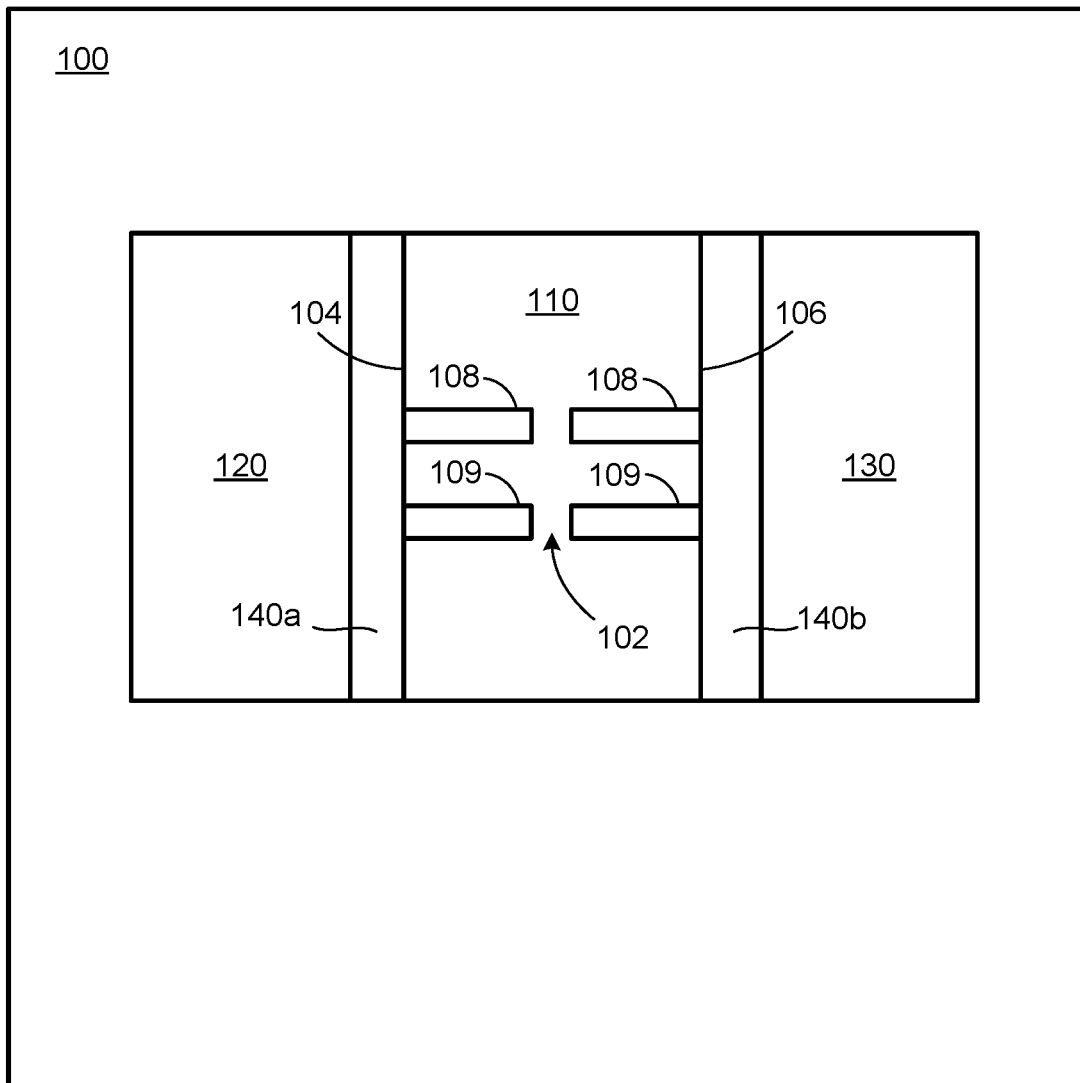
FIG. 1 illustrates an integrated circuit layout generated from cells, according to one embodiment.

EDA products may include software that generates a layout for an integrated circuit. In one embodiment, an EDA system receives a cell library that includes a set of cells designed to be placed side by side in rows. An example of cell design is shown in the description of FIG. 1. The set of cells may include standard cells and modified versions of the standard cells. The EDA system may generate at least a portion of the layout for the integrated circuit by arranging instances of cells from the library. The EDA system may connect instances of the cells together to implement a desired functionality of the integrated circuit.

The EDA system may generate gridded layout designs. In a gridded design, edges of circuit components such as cells are aligned to a pre-determined grid. In some embodiments, transistor gates of layouts (e.g., layout 100) have a fixed distance between adjacent gates, where this fixed distance is typically equal to the contacted gate pitch, often called the contacted poly pitch or CPP. The gate pitch may be a multiple of the grid units in the pre-determined grid. As referred to herein, the terms "gate pitch," "CPP," "placement grid," and "grid" may be used interchangeably to describe cell dimensions (e.g., widths) and cell placement (e.g., distance between edges of cells) within a layout design. Cell edges may be parallel to transistor gates. In particular, the term "gate pitch" may be used herein to quantify a distance from which a cell is placed from another cell or part of the other cell. For example, a cell may be placed a distance D1 from another cell's diffusion break or placed D1 gate pitches away from the other cell's diffusion break. References to distances such as E, D, D1, etc., made without specifying a unit of distance are implied to have a unit of distance in gate pitches.

Example Integrated Circuit

FIG. 1 illustrates integrated circuit layout 100 generated from cells, according to one embodiment. Integrated circuit layout 100 includes cells 110, 120, and 130. The cells are organized into a single row where dummy transistors 140a span the edges of cells 110 and 120 and another set of dummy transistors 140b span the edges of cells 110 and 130. Dummy transistors may be located at the edges of cells to isolate the diffusion within the cell from that of an adjacent cell. A cell may be bounded on four sides or edges and represent any generic cell such as an inverter, a NAND gate, a NOR gate, or a flip-flop. Although layout 100 has been simplified to promote clarity, layout 100 may include additional cells that are not depicted.

Cell 110 is bounded on one side by edge 104 and on an opposing side by edge 106. Spanning from edge 104 to edge 106 are diffusion regions 108 and 109. Diffusion region 108 may be a p-type diffusion region (i.e., a p-diffusion) and diffusion region 109 may be an n-type diffusion region (i.e., an n-diffusion). Diffusion break 102 separates diffusion regions 108 and 109. That is, diffusion region 108 is split into two electrically isolated regions: a region from edge 104 to diffusion break 102 and another region from diffusion break 102 to edge 106. Similarly, diffusion region 109 is also split into two electrically isolated regions. In one example, standard cell 110 may be a well-tap or TAP cell containing diffusion break 102 and components not shown such as an n-well and substrate contacts needed to prevent latch-up. Additional examples of cells with diffusion breaks are described in the description of FIGS. 2 and 3.

A diffusion break may degrade the metric of cells located near the diffusion break. In some embodiments, a diffusion break affects at least one of the delay, slew, dynamic power, and leakage of cells placed nearby. The level of degradation depends on the distance separating another cell from the diffusion break. In some embodiments, the metric of cells is affected by the diffusion break and will degrade beyond a threshold level when the cells are placed within a certain distance of the diffusion break. For example, the metric of cells placed within ten gate pitches of a diffusion break may degrade beyond the threshold level. The threshold level of metric degradation refers to a minimum, nonzero amount of reduction in a metric of cells near diffusion breaks. For example, a diffusion break may increase the delay of an adjacent cell by 10-15% or increase the leakage of an adjacent cell by 50%, depending on the technology. The diffusion impact may vary with transistor characteristics (e.g., threshold voltage). The term "a threshold level" is used to refer to a threshold level of degradation of at least one metric. For example, the diffusion break may degrade the metric of a cell beyond a threshold level because the diffusion break increases the dynamic power consumption by a minimum, nonzero amount despite not impacting other metrics such as delay or leakage.

The degradation in the cell's metric may be modeled in derate tables. In some embodiments, EDA system generates models or derate tables that characterize metrics of cells placed near diffusion breaks (e.g., delay). For example, derate tables may be characterized for one cell based on different combinations of the cell's input slew and output load. The generation of models and corresponding metrics based on cell placement is further described in the description of FIGS. 4-7.

FIG. 1 shows cells 120 and 130 placed with dummy transistors 140a and 140b electrically isolating the cells 120 and 130 from cell 110 having diffusion break 102. The gates of dummy transistors 140a and 140b may be tied to supply or ground to provide a desired electrical isolation. Each set of dummy transistors 140a and 140b may include one or more transistors spanning between an edge of cell 110 and edges of either cells 120 or 130. Diffusion break 102 may not degrade the metric of cells 120 and 130 due to the electrical isolation caused by dummy transistors 140a and 140b.

Although layout 100 is shown with dummy transistors 140a and 140b, cells 120 and 130 may avoid the degradation of a metric caused by diffusion break 102 if placed a certain distance from diffusion break 102. For example, if the edge of cell 120 abutting edge 104 is greater than ten gate pitches from diffusion break 102, the metric of cell 120 may be unaffected. If, however, the edge of cell 130 abutting edge 106 is ten gate pitches from diffusion break 102, the metric of cell 130 may degrade beyond the threshold level. Examples of cell placement near diffusion breaks are described in the description of FIGS. 4-7.

Example Cells with Diffusion Break

Figure 2:
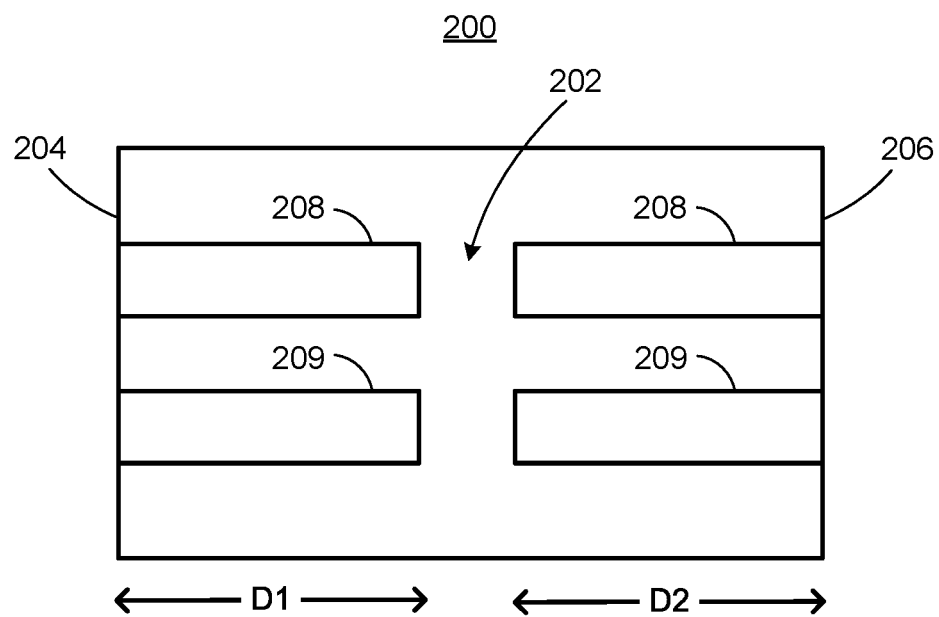
FIG. 2 illustrates a cell with a diffusion break, according to one embodiment.

FIG. 2 illustrates cell 200 with diffusion break 202, according to one embodiment. Cell 200 is bounded by edges 204 and 206 and includes diffusion break 202 and diffusion regions 208 and 209. Diffusion regions 208 and 209 extend from edge 204 to edge 206 and are separated by diffusion break 202. Edge 204 is separated from diffusion break 202 by D1, and edge 206 is separated from diffusion break 202 by D2. D1 and D2 may be equivalent or different number of gate pitches in distance. Both D1 and D2 are greater than D from the diffusion break. D may be defined as a maximum distance of a diffusion break of a first cell (e.g., cell 200) to an edge of a second cell (not shown) on either side of the diffusion break such that the diffusion break degrades more than a threshold level of a metric of the second cell (e.g., the metric of the second cell does not satisfy a threshold level). That is, D is a predetermined threshold distance such that a metric of cells is unaffected by or does not change substantially due to the diffusion break when the cells are placed greater than D from the diffusion break. Accordingly, the metric of another cell placed abutting either edge 204 or 206 will not be affected by diffusion break 202. As referred to herein, a "safe edge" is an edge of a cell that is separated from a diffusion break of the cell by greater than D. For example, edges 204 and 206 are both safe edges of cell 200. On the contrary, as described in the description of FIG. 3, the metric of another cell placed at a number of gate pitches that is less than or equal to D from the diffusion break will be affected above a threshold by the diffusion break 202.

Figure 3:
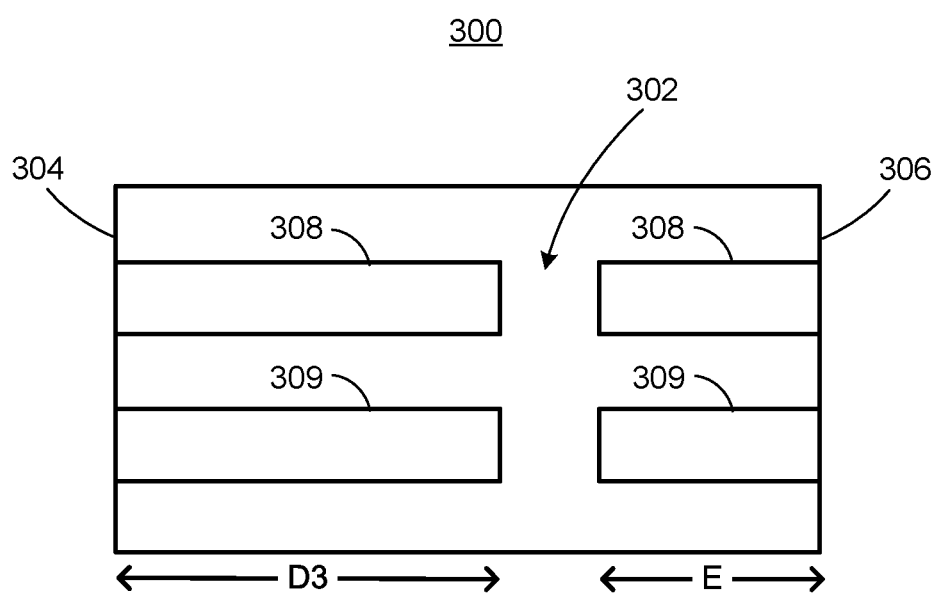
FIG. 3 illustrates a cell with a diffusion break separated from a cell edge by a specified number of gate pitches, according to one embodiment.

FIG. 3 illustrates cell 300 with diffusion break 302 separated from cell edge 306 by a specified number of gate pitches, according to one embodiment. Cell 300 is bounded by edges 304 and 306 and includes diffusion break 302 and diffusion regions 308 and 309. Diffusion regions 308 and 309 extend from edge 304 to edge 306 and are separated by diffusion break 302. Edge 304 is separated from diffusion break 302 by D3, and edge 306 is separated from diffusion region 306 by a specific number of E gate pitches that is less than or equal to D. This distance of E is referred to herein as a "user-specified distance" or "specified distance." E may be a design parameter specified by an EDA system user. That is, cell placement near diffusion breaks may be constrained to be separated from the diffusion breaks by exactly E. A cell may be placed E to the right of diffusion break 302 such that it is greater than D from a diffusion break to its right. In some embodiments, cells may not be placed less than or equal to D to the right of diffusion break 302 unless the distance is exactly E. Likewise, a cell may be placed at E to the left of diffusion break 302 such that it is greater than D to the right of any diffusion break to its left.

D3 is greater than D and edge 304 is a safe edge. However, E is less than or equal to D. As referred to herein, a "critical edge" is an edge of a cell that is separated from a diffusion break of the cell by E that is less than or equal to D. Edge 306 is a critical edge of cell 300. Another cell placed abutting edge 306 may experience a degradation in metric beyond a threshold level due to the proximity to diffusion break 302. However, another cell placed abutting edge 304 will not be affected by diffusion break 302. The placement of cells near diffusion break 302 is described in further detail in the description of FIG. 4.

Models for Integrated Circuit Design Simulation

EDA system may simulate the effects of a diffusion break on nearby cells and provide the simulation results to EDA users using one or more models or derate tables. A derate table may be a matrix of metrics, where each value of the matrix includes one or more metrics characterizing the impact of the diffusion break upon cells placed at given distances from the diffusion break. In some embodiments, the dimensions of the matrix correspond to the maximum distances a cell can be placed on either side of the diffusion break while experiencing a degradation in metric beyond a threshold level. For example, a derate table having dimensions D×D includes metrics for cells placed 1, 2, . . . , and D gate pitches from one side of the diffusion break (e.g., to the left of the diffusion break) and metrics for cells placed 1, 2, . . . , and D gate pitches from another side of the diffusion break (e.g., to the right of the diffusion break).

Metrics such as a delay, a slew, dynamic power, and leakage may be included in a derate table. For example, a value located at the first row and second column of a derate table may correspond to the effects from a diffusion break on the leakage of another cell placed abutting a critical edge that is one gate pitch from the left of the diffusion break or two gate pitches from the right of the diffusion break.

A derate table may be assembled from one or more models that capture the effects of a diffusion break on one or more metrics. Furthermore, the values of a derate table of a given dimension may vary depending on different input slew and output load combinations for which nearby cells are characterized. Due to this variation, the number of models included in a derate table may increase. That is, a D×D derate table (e.g., $D^2$ models) may suffice to characterize metrics for a single combination of input slew and output load, but $D^2$ models may be needed for each combination in the various input slew and output load combinations. This increase may cause cell characterization and timing analysis to consume additional memory usage and computation time. The placement of cells near diffusion breaks described herein may reduce the number of models needed to capture the impact of diffusion breaks in integrated circuit design simulations.

In some embodiments, the EDA system implements one or more design parameters during the simulation of an integrated circuit design. For example, a specified distance of E gate pitches is a design parameter causing cells in the integrated circuit design to be placed at E gate pitches from a diffusion break.

By applying a specified distance of E gate pitches from which cells are placed, the EDA system reduces the number of models needed to capture the impact of diffusion breaks in integrated circuit design simulation. In particular, the EDA system may force cells in an integrated circuit design to be placed at a distance that is either E or greater than D away from a diffusion break.

The EDA system may characterize the impact of diffusion breaks using one or more of three derate models. These models are used to calculate a metric of a cell depending on the placement of the cell near a diffusion break. A first model is associated with positioning a cell a distance E from a first side of a diffusion break (e.g., the left of the diffusion break), where the cell's right edge is the critical edge and the left edge is a safe edge. A second model is associated with positioning a cell at a distance E from a second side of a diffusion break (e.g., the right of the diffusion break), where the cell's left edge is the critical edge and the right edge is a safe edge. A third model is associated with positioning a cell with a first side and a second side opposite to the first side that are both at greater than D from diffusion breaks. In some embodiments, the EDA system may use a fourth model associated with positioning a cell at E from a respective adjacent diffusion breaks on both a first side and a second side opposite to the first side of the cell (i.e., a first cell having a diffusion break to the left of the cell and a second cell having a diffusion break to the right of the cell).

In some embodiments, the EDA system may use multiple, user-specified distances to place a cell's edge away from a diffusion break. The number of derate models needed to calculate cell metrics increases with the number of user-specified distances. As described above, for one user-specified distance E, three models are needed: the first model for placing a cell to the left of a diffusion break by E, the second model for placing the cell to the right of a diffusion break by E, and the third model for placing the cell to either side of the diffusion break by greater than D. For two user-specified distances, E and E', two more models are needed: a fourth model for placing a cell to the left of a diffusion break by E' and a fifth model for placing the cell to the right of a diffusion break by E'.

The number of models needed for simulation may be determined or generated based on cell placement design (e.g., the user-specified distance from a diffusion break and a number of critical edges per cell). For example, cells within a library may be constructed such that cells may only have one critical edge and have cell edges limited to placement at either a user-specified distance of E or greater than D. In this way, only three models may be needed. In embodiments where cells within a library may be constructed to have multiple critical edges and cell edges limited to placement at either E or greater than D, four models may be needed (i.e., an additional fourth model for placement of a cell to both the left and right of respective diffusion breaks by E).

The EDA system may select at least one of the first, second, and third models and perform a simulation of an integrated circuit design using the selected model or models. In some embodiments, the fourth model is included for selection with the first three models. Each model may include metrics to be applied during simulation of a cell positioned appropriately relative to a diffusion break. For example, the EDA system may select the first model to apply corresponding metrics for a cell positioned E from the left side of a diffusion break. Selection of models by the EDA system is described in the descriptions of FIGS. 4-6.

Example Cell Placement Near Diffusion Breaks

Figure 4:
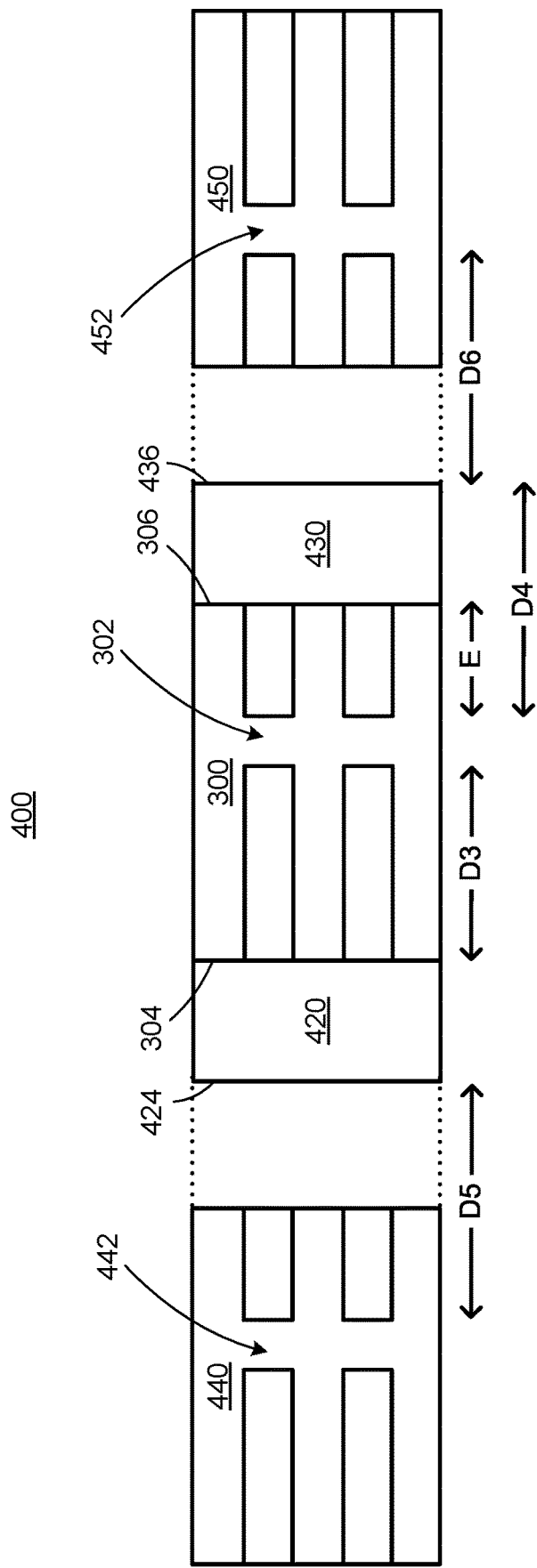
FIG. 4 illustrates a cell placement including cells abutting the cell of FIG. 3 with a diffusion break, according to one embodiment.
Figure 5:
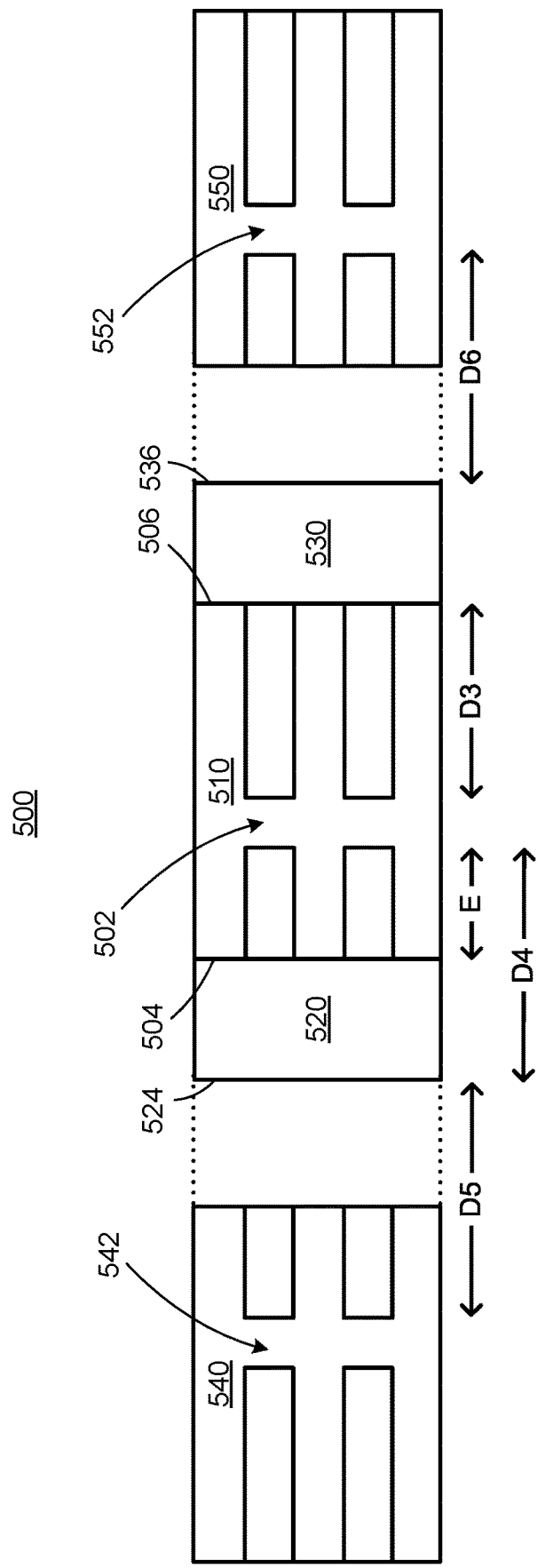
FIG. 5 illustrates a cell placement including cells abutting a cell with a diffusion break, according to one embodiment.
Figure 6:
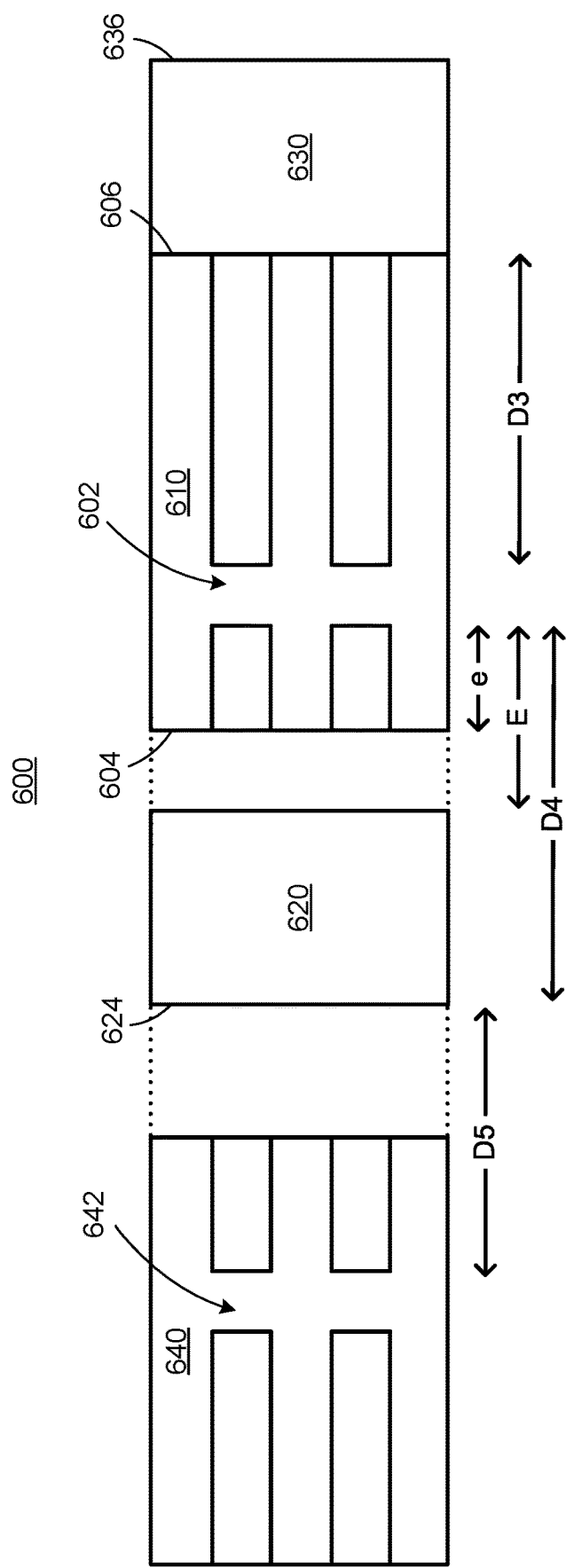
FIG. 6 illustrates a cell placement including a cell separated from a diffusion break without abutting a cell with the diffusion break, according to one embodiment.

FIGS. 4-6 illustrate examples of cell placements near diffusion breaks, according to embodiments. The impact of a diffusion break on nearby cells may be dependent on the distance from which edges of nearby cells are separated from the diffusion break. Each of FIGS. 4-6 is described herein with respect to both the depicted placement and the simulation thereof using one or more models or derate tables. Each example shows at least one cell placed at a specified distance E, away from a diffusion break.

FIG. 4 illustrates a cell placement including cells abutting the cell of FIG. 3 with a diffusion break, according to one embodiment. Cell placement 400 shows cells 420 and 430 abutting cell 300 with diffusion break 302. Cell 420 abuts edge 304, a safe edge that is separated from diffusion break 302 by D3. The metric of cell 420 is not affected by diffusion break 302 because of its placement next to the safe edge. By contrast, the metric of cell 430 is affected by diffusion break 302 beyond a threshold level since cell 430 abuts edge 306, a critical edge that is separated from diffusion break 302 by E. D6 s is greater than D so cell 430 is not affected by diffusion break 452 in cell 450 placed to its right. D4 is greater than the D and edge 436 of cell 430 is a safe edge. Another cell placed abutting edge 436 will not be affected by diffusion break 302, but it might be affected by diffusion break 452 in cell 450 if its right edge is less than D from diffusion break 452. As depicted in FIG. 4, cell 430 is placed abutting cell 300 and E away from diffusion break 302. However, cells may be placed separated from an edge (i.e., not abutting the edge) by E rather than abutting by E. An example of this is described in the description of FIG. 6.

Additionally, cell placement 400 includes cell 440 having diffusion break 442 and cell 450 having diffusion break 452. D5 and D6 are both greater than D. Edge 424 of cell 420 is D5 from diffusion break 442 and thus, remains a safe edge that is separated from diffusion breaks 442 and 302 by greater than D. Likewise, edge 436 of cell 430 remains a safe edge that is separated from diffusion breaks 452 and 302 by greater than D. Accordingly, diffusion breaks 442 and 452 do not affect the metrics of cells 420 and 430, respectively. Cell 430 remains affected by diffusion break 302 due to edge 306 being a critical edge.

Cell placement 400 may be simulated by an EDA system using two models. The EDA system may select the third model for simulation, where the third model includes metrics associated with positioning cell 420 at greater than D from diffusion break 302. In addition, the EDA system may select the second model for simulation, where the second model includes metrics associated with positioning cell 430 at E from the right side of diffusion break 302.

In some embodiments, while not depicted in FIG. 4, cell 440 may be positioned such that the diffusion break 442 is E away from the edge 424, causing cell 420 to have a critical edge (edge 424) and a safe edge (edge 304). In this cell placement, the EDA system may use the second model for simulation of both cells 420 and 430, where the second model includes metrics associated with positioning cells 420 and 430 at E from the right sides of diffusion breaks 442 and 302 respectively.

In some embodiments, cell placement 400 may include a physical cell formed from one or more logic cells. For example, cells 300 and 430 may be logical cells that are merged to form a single, physical cell. This physical cell functions equivalently to cells 300 and 430 as depicted in FIG. 4. That is, the physical cell includes the diffusion region having diffusion break 302 and includes the logic function from cell 430 (e.g., an AND function). Just as the left edge of cell 300 and the right edge of cell 430 are each separated from diffusion break 302 by greater than D, the left and right edges of the physical cell are also greater than D from diffusion break 302. According, cells placed next to the physical cell are not affected by the diffusion break 302 and hence, do not experience a performance change beyond a threshold level.

FIG. 5 illustrates a cell placement including cells abutting a cell with a diffusion break, according to one embodiment. Cell placement 500 shows cells 520 and 530 abutting cell 510 with diffusion break 502. Cell 520 abuts edge 504, a critical edge that is separated from diffusion break 502 by E. The metric of cell 520 is affected by diffusion break 502 beyond a threshold level because of its placement next to the critical edge. However, the metric of cell 530 is not affected by diffusion break 502 as cell 530 abuts edge 506, a safe edge that is separated from diffusion break 502 by D3, where D3 is greater than D. Edge 524 of cell 520 is a safe edge. Another cell placed abutting edge 524 will not be affected by diffusion break 502. Although not depicted, an additional cell with a diffusion break may be placed on the left of cell 520 or on the right of cell 530 such that the additional cell's diffusion break is separated from edge 524 or 536 by greater than D.

Additionally, cell placement 500 includes cell 540 having a diffusion break 542 and cell 550 having a diffusion break 552. D5 and D6 are both greater than D. Edge 524 of cell 520 is a safe edge that is separated from diffusion breaks 542 and 502 by greater than D. Similarly, edge 536 of cell 530 is separated by greater than D from diffusion breaks 552 and 502 and thus, remains a safe edge. Accordingly diffusion breaks 542 and 552 do not affect the metrics of cells 520 and 530 respectively. However, cell 520 remains affected by diffusion break 502 due to edge 504 being a critical edge.

Cell placement 500 may be simulated by an EDA system using two models. The EDA system may select the first model for simulation, where the first model includes metrics associated with positioning cell 520 at E from the left side of diffusion break 502. In addition, the EDA system may select the third model for simulation, where the third model includes metrics associated with positioning cell 530 at greater than D from diffusion break 502.

FIG. 6 illustrates a cell placement including a cell separated from a diffusion break without abutting a cell with the diffusion break, according to one embodiment. Cell placement 600 includes cell 620 that does not abut edge 604, a critical edge that is separated from diffusion break 602 by e gate pitches, which is a number of gate pitches that is less than E gate pitches. In some embodiments, the EDA system may determine to place cell 620 at a separation distance away from the edge 604, the separation distance corresponding to the difference in gate pitches between E and e (i.e., E−e). The metric of cell 620 is affected by diffusion break 602 beyond a threshold level due to its separation from diffusion break 602 by the specified distance E. However, the metric of cell 630 is not affected by diffusion break 602 as cell 630 abuts edge 606, a safe edge that is separated from diffusion break 602 by D3, where D3 is greater than D. Edge 624 of cell 620 is a safe edge. Another cell placed abutting edge 624 will not be affected by diffusion break 602. In some embodiments, an additional cell with a diffusion break may be placed on the left of cell 620 or on the right of cell 630 such that the additional cell's diffusion break is separated from the edge 624 or 636 by greater than D. For example, cell 640 is placed on the left of cell 620 such that diffusion break 642 of cell 640 is separated from edge 624 by D5, where D5 is greater than D.

Although edge 604 is separated from diffusion break 602 by e, the EDA system may implement a design parameter that forces cell 620 to be placed separated from diffusion break 602 by E rather than by e. In this way, the EDA system only has to select the first model for simulation, where the first model includes metrics associated with positioning cell 620 at E from the left side of diffusion break 602 rather than select another model associated with positioning cell 620 at e from diffusion break 602. In addition, the EDA system may select the third model for simulation, where the third model includes metrics associated with positioning cell 630 at greater than D from diffusion break 602. This reduces the number of models required for simulation.

Figure 7:
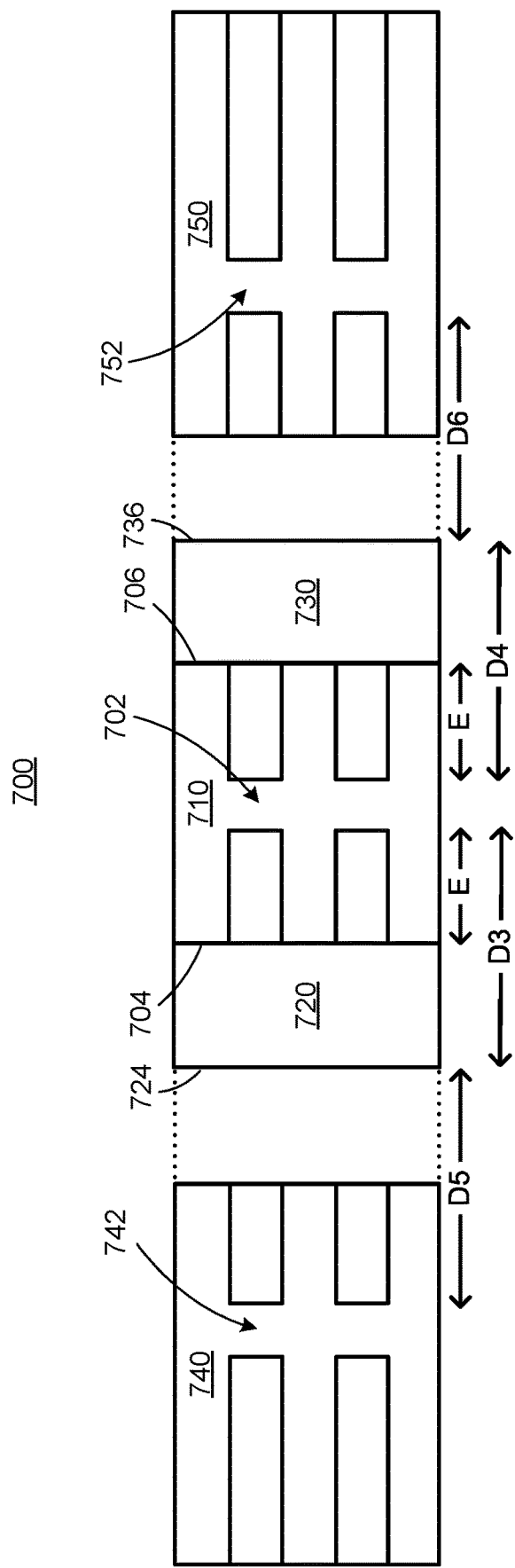
FIG. 7 illustrates a cell placement including cells both separated from a diffusion break by a specified number of gate pitches, according to one embodiment.

FIG. 7 illustrates a cell placement including cells both separated from a diffusion break by a specified distance of E gate pitches, according to one embodiment. Cell placement 700 includes cells 720 and 730 that abut edges 704 and 706, respectively, of cell 710 having diffusion break 702. Edges 704 and 706 are both critical edges as edges 704 and 706 are at a specified number of E gate pitches from diffusion break 702. Consequently, cells 720 and 730 are affected by diffusion break 702 beyond a threshold level. Edge 724 of cell 720 and edge 736 of cell 730 are safe edges. A cell placed abutting edge 724 or edge 736 will not be affected by diffusion break 702. Cell 740 with diffusion break 742 may be placed on the left of cell 720 and cell 750 with diffusion break 752 may be placed on the right of cell 730. Diffusion break 742 is separated from edge 724 by D5 and diffusion break 752 is separated from edge 736 by D6, where D5 and D6 are both greater than D. Accordingly, the EDA system may select the first and second models for simulation, where the first model includes metrics associated with positioning cell 720 at E from the left side of diffusion break 702 and the second model includes metrics associated with positioning cell 730 at E from the right side of diffusion break 702.

Figure 8:
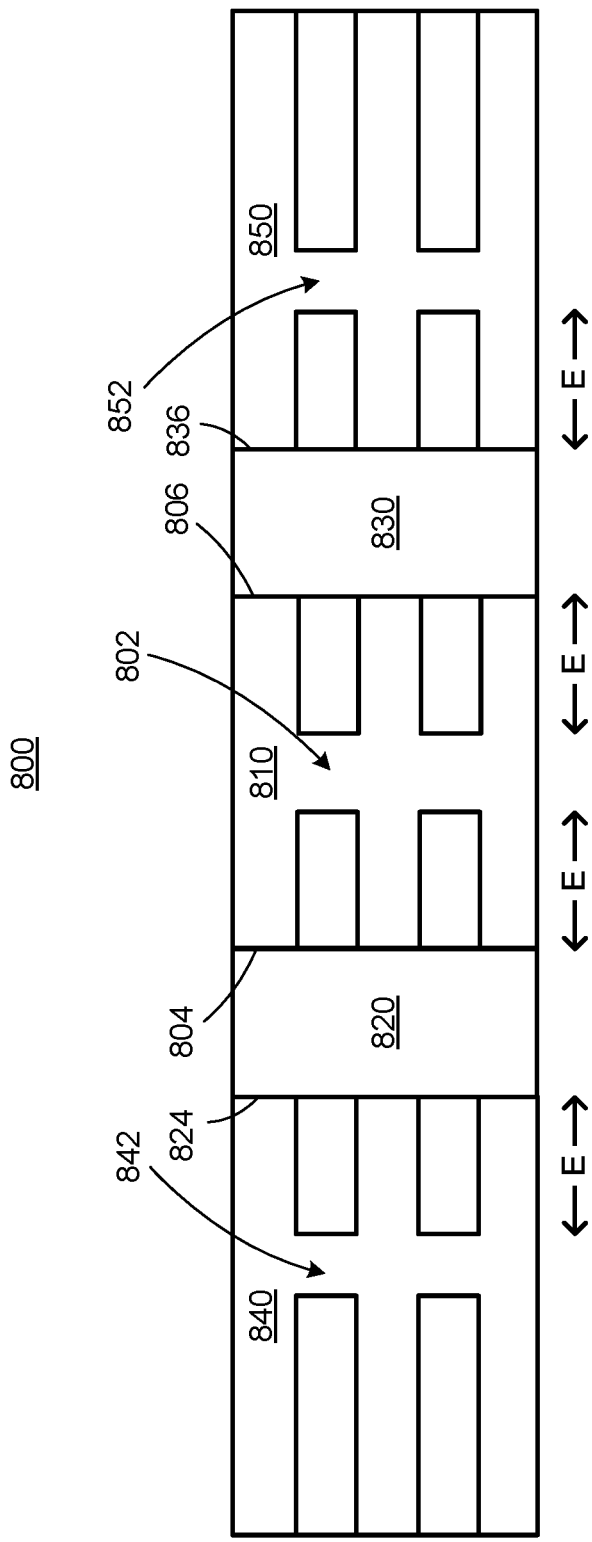
FIG. 8 illustrates a cell placement including cells both separated from diffusion breaks by specified number of gate pitches, according to one embodiment.

FIG. 8 illustrates a cell placement including cells both separated from diffusion breaks by specified distance of E gate pitches, according to one embodiment. Cell placement 800 includes cells 820 and 830 that abut edges 804 and 806, respectively, of cell 810 having diffusion break 802. Edges 804 and 806 are critical edges as edges 804 and 806 are at E gate pitches from diffusion break 802. Similarly, edges 824 and 836 are critical edges because they are at E gate pitches from diffusion breaks 842 and 852 respectively. Thus, the EDA system may select the fourth model for simulation for cell placement 800 having cells 820 and 830 each with two critical edges. The fourth model may include metrics associated with positioning cell 820 at E from diffusion breaks 842 and 802 at both of its edges and positioning cell 830 at E from diffusion breaks 852 and 802 at both of its edges.

Example Electronic Design Automation System and Workflow

Figure 9:
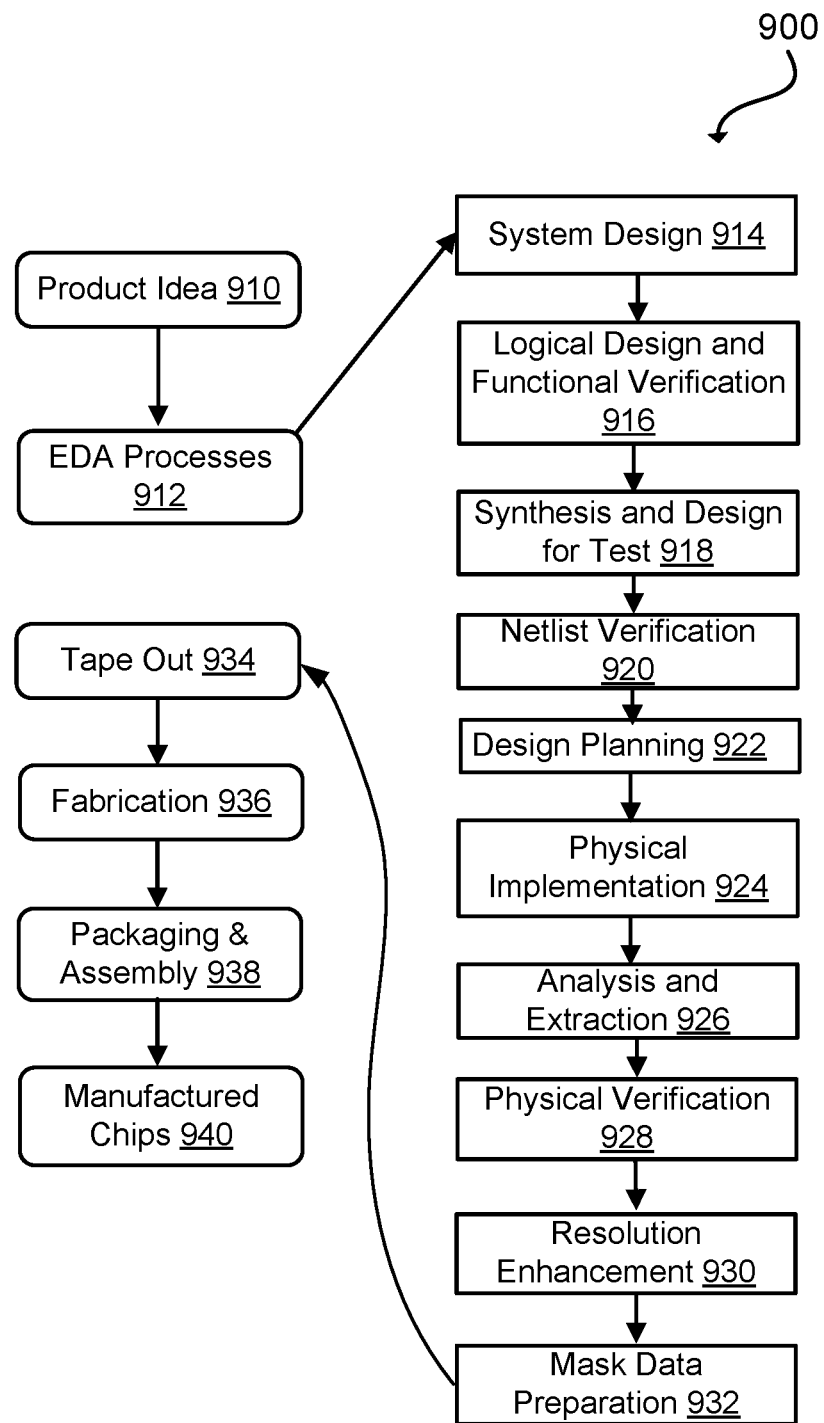
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. The cell design and placement techniques described herein may be applied by an EDA product during layout or physical implementation 924. As used herein, the term 'cell' may specify a set of transistors, other components, and interconnections that provides a Boolean logic function (e.g., AND, OR, INV, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

General Computer System Applications

Figure 10:
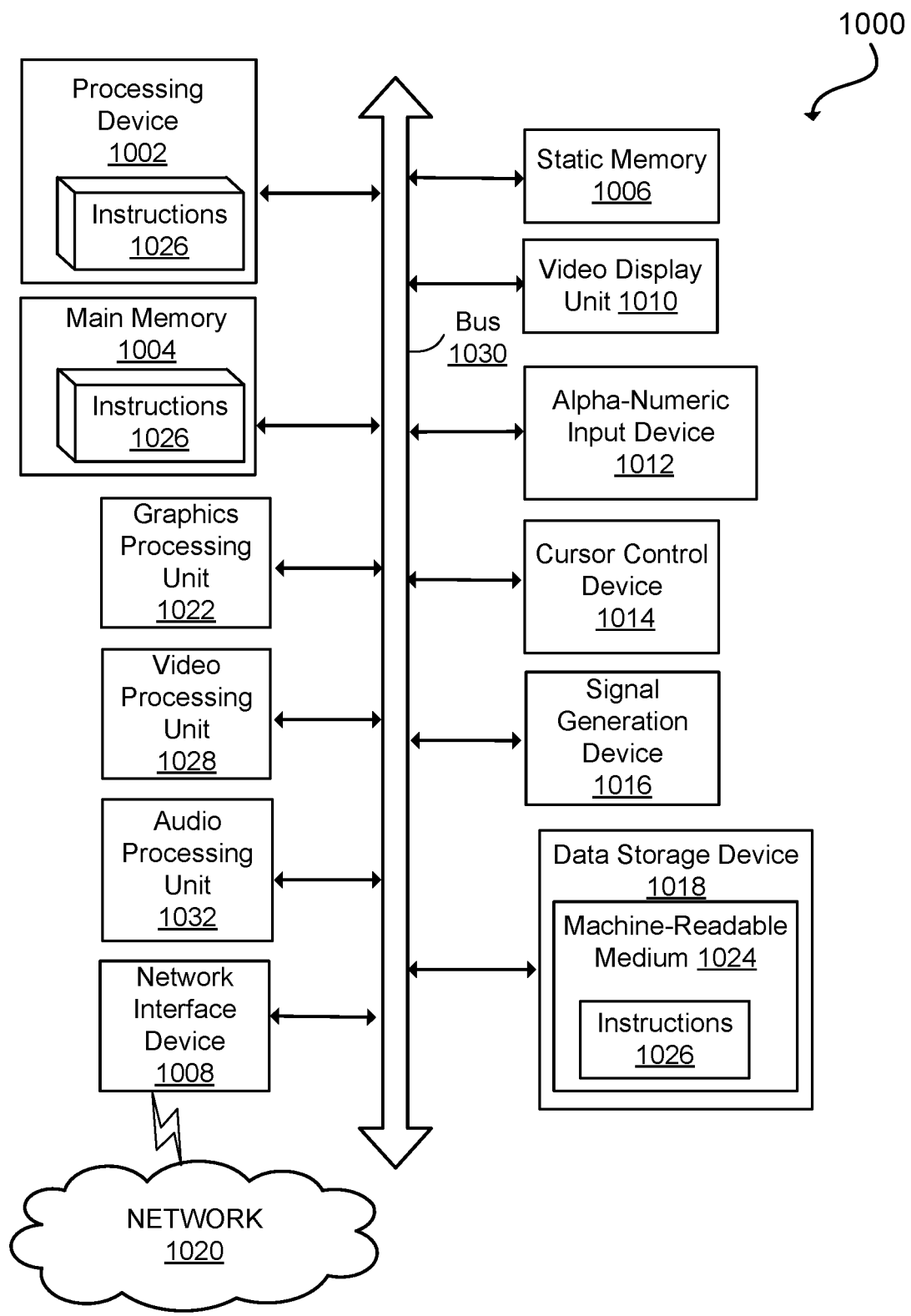
FIG. 10 depicts an abstract diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Additional Configuration Considerations

Example benefits and advantages of the disclosed configurations include improved efficiency in design space utilization, memory usage, and processing consumption. The disclosed cell design and placement techniques were implemented in an experimental semiconductor process to make use of the space surrounding cells having diffusion breaks (e.g., TAP cells). Compared to the conventional methods that either do not use the space near the TAP cells or increase the size of the cell having the diffusion break, the disclosed cell design and placement techniques herein increased usable area for cell placement by over 1.5%, with minimal degradation in design performance. For example, the placement technique described herein may avoid the need to pad edges of a TAP cell with dummy transistors (e.g., at least 10 dummy transistors) to isolate other cells from its diffusion break but would take up space. Hence, the techniques described herein allow for the efficient utilization of space within an integrated circuit design. Additionally, compared to conventional methods of using complex models which result in large cell model sizes (e.g., increasing a model size by two orders of magnitude), the disclosed cell design and placement techniques herein merely doubled the model size. By reducing the size of models needed to capture diffusion break effects, the techniques described herein efficiently use an EDA tool's memory and processing resources.

Additionally, the placement techniques described herein may augment the intentional delay introduced by delay cells. In some embodiments, space near critical edges may be reserved exclusively for delay cells in initial design phases, which may fix hold time violations. Alternatively, the space may be reserved for any cells inserted during late stage timing closure. In these embodiments, the reserved space (i.e., keep-out regions) near critical edges is blocked off during initial design stages (e.g., physical synthesis and pre-route design stages) and opened up for hold fixing or late stage timing closure changes. In the case of hold time changes, there may be an added benefit that delay cells have larger delay when abutting critical edges, which is desirable for fixing hold time violations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where values are described as "approximate" or "substantially" (or their derivatives), such values should be construed as accurate +/−10% unless another meaning is apparent from the context. From example, "approximately ten" should be understood to mean "in a range from nine to eleven."

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for cell design and placement in continuous diffusion semiconductor processes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium storing data representing a layout of a first cell of an integrated circuit, the first cell of the integrated circuit comprising:
    a first edge;
    a second edge at an opposite side to the first edge of the first cell;
    a diffusion region extending from the first edge to the second edge; and
    a break in the diffusion region dividing the diffusion region into a first diffusion region and a second diffusion region spaced by the break in the diffusion region, the break in the diffusion region spaced away from a third edge of a second cell by a specified distance that degrades a metric of the second cell beyond a threshold level,
    wherein the non-transitory computer readable medium stores a simulation model associated with the third edge spaced away from the break in the diffusion region by the specified distance that is less than or equal to a threshold distance, and
    a simulation of the second cell is performed using the simulation model.

2. The non-transitory computer readable medium of claim 1, wherein the first cell is a well tap cell and the second cell is a delay cell.

3. The non-transitory computer readable medium of claim 1, wherein the second cell abuts the first cell, or the second cell is separated from the break in the diffusion region.

4. The non-transitory computer readable medium of claim 1, wherein the third edge of the second cell is separated from the second edge by a separation distance that corresponds to a difference between the specified distance and a distance that is less than the specified distance.

5. The non-transitory computer readable medium of claim 1, wherein the break in the diffusion region is spaced away from the first edge by a predetermined threshold distance that causes the metric of a given cell placed next to the first edge to be substantially unaffected by the break in the diffusion region.

6. The non-transitory computer readable medium of claim 1, wherein the second edge is to the left of the break in the diffusion region or to the right of the break in the diffusion region.

7. The non-transitory computer readable medium of claim 1, wherein the non-transitory computer readable medium further stores a plurality of simulation models, wherein each simulation model of the plurality of simulation models is associated with a respective edge of a given cell spaced away from a given diffusion break by a corresponding specified distance that is less than or equal to the threshold distance.

8. The non-transitory computer readable medium of claim 7, wherein the plurality of simulation models comprises:
    a first model including a first plurality of metrics associated with placing the third edge facing the first edge and spaced away from the break in the diffusion region by the specified distance;
    a second model including a second plurality of metrics associated with placing the third edge facing the second edge and spaced away from the break in the diffusion region by the specified distance; and
    a third model including a third plurality of metrics associated with placing the third edge spaced away from the break in the diffusion region by the distance that is greater than the threshold distance.

9. The non-transitory computer readable medium of claim 7, wherein the specified distance is one of a plurality of specified distances, and at least a first respective simulation model and a second respective simulation model of the plurality of simulation models are associated with each specified distance of the plurality of specified distances, wherein:
    the first respective model includes a first plurality of metrics associated with placing the third edge facing the first edge and spaced away from the break in the diffusion region by the respective specified distance, and
    the second respective model includes a second plurality of metrics associated with placing the third edge facing the second edge and spaced away from the break in the diffusion region by the respective specified distance.

10. The non-transitory computer readable medium of claim 7, wherein a distance from the break in the diffusion region to the first edge is less than the specified distance and wherein the third edge facing the first edge is spaced away from the first edge by a separation distance that corresponds to a difference between the distance and the specified distance.

11. An integrated circuit at least partially instantiated from a first cell, the first cell comprising:
    a first edge;
    a second edge at an opposite side to the first edge of the first cell;
    a diffusion region extending from the first edge to the second edge; and
    a break in the diffusion region dividing the diffusion region into a first diffusion region and a second diffusion region spaced by the break in the diffusion region, the break in the diffusion region spaced away from a third edge of a second cell by a specified distance that degrades a metric of the second cell beyond a threshold level, wherein a simulation model is associated with the third edge spaced away from the break in the diffusion region by the specified distance that is less than or equal to a threshold distance, and a simulation of the second cell is performed using the simulation model.

12. The integrated circuit of claim 11, wherein the first cell is a well tap cell and the second cell is a delay cell.

13. The integrated circuit of claim 11, wherein the second cell abuts the first cell, or the second cell is separated from the break in the diffusion region.

14. The integrated circuit of claim 11, wherein the second cell is separated from the second edge by a separation distance that corresponds to a difference between the distance and a user-specified distance.

15. The integrated circuit of claim 11, wherein the break in the diffusion region is spaced away from the first edge by a predetermined threshold distance that causes the metric of a given cell placed next to the first edge to be substantially unaffected by the break in the diffusion region.

16. The integrated circuit of claim 11, wherein the break in the diffusion region is spaced away from the first edge by the specified distance that causes the metric of a given cell placed next to the first edge to be degraded beyond the threshold level by the break in the diffusion region.

17. The integrated circuit of claim 11, wherein the second edge is to the left of the break in the diffusion region or to the right of the break in the diffusion region.

18. The integrated circuit of claim 11, wherein:
the diffusion region is a first diffusion region,
the break in the diffusion region is a second diffusion break, and
the integrated circuit is further instantiated from a third cell comprising a second diffusion region with the second diffusion break separating the second diffusion region.

19. The integrated circuit of claim 18, wherein the second diffusion break is spaced away from a fourth edge of the second cell by at least a predetermined threshold distance that causes the metric of the second cell to be substantially unaffected by the second diffusion break.

20. The integrated circuit of claim 18, wherein the second diffusion break is spaced away from a fourth edge of the second cell by the specified distance that causes the metric of the second cell to be degraded beyond the threshold level by the second diffusion break.

* * * * *